US009817543B2

(12) United States Patent
Coyner et al.

(10) Patent No.: US 9,817,543 B2
(45) Date of Patent: *Nov. 14, 2017

(54) INFORMATION SURFACING WITH VISUAL CUES INDICATIVE OF RELEVANCE

(71) Applicant: Microsoft Technology Licensing, LLC, Redmond, WA (US)

(72) Inventors: Donald Robert Coyner, Seattle, WA (US); David Jones, Seattle, WA (US); Rudy Poot, Tiburon, CA (US); Christopher Eoin Miles, Oakland, CA (US); Ammon Haggerty, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,458

(22) Filed: Jan. 30, 2017

(65) Prior Publication Data

US 2017/0147181 A1    May 25, 2017

Related U.S. Application Data

(63) Continuation of application No. 14/139,853, filed on Dec. 23, 2013, now Pat. No. 9,563,328.

(51) Int. Cl.
*G06F 3/00* (2006.01)
*G06F 3/0481* (2013.01)
(Continued)

(52) U.S. Cl.
CPC ............ *G06F 3/04815* (2013.01); *G06T 3/20* (2013.01); *G06T 3/60* (2013.01); *G09G 3/36* (2013.01);
(Continued)

(58) Field of Classification Search
CPC ........................... G06F 3/0481; G06F 3/04842
See application file for complete search history.

(56) References Cited

U.S. PATENT DOCUMENTS 6,621,508 B1    9/2003   Shiraishi et al.
8,347,228 B1    1/2013   Kates et al.
(Continued)

OTHER PUBLICATIONS

"Floating Notifications and Multitasking with Open Sourced HALO", Retrieved from <<https://web.archive.org/web/20131121235028/http://www.youtube.com/watch?v=hYVSVj22YSk>>, Jun. 25, 2013, 3 Pages.
(Continued)

*Primary Examiner* — Omar Abdul-Ali
(74) *Attorney, Agent, or Firm* — The Watson IP Group, PLC; Vladan M. Vasiljevic

(57) ABSTRACT

A user interface through which information is proactively provided utilizes visual cues indicative of the relevance of the information that is being proactively provided. Such visual cues include sizing, color, intensity, movement, and other like visual attributes. A single discrete visual element proactively presents information to the user. The user is provided with the opportunity to define discrete events, whereby information associated with such events is presented through other discrete elements. The physical orientation of such discrete elements indicates relationships between elements. Ranking functionality identifies more immediately relevant information and the rankings of related elements are increased based upon other, contextual information with which such information is associated, and on which the importance of such information is based. Information is surfaced to provide a vector through which the user responds or utilizes such surfaced information independently of specific application programs having discrete informational focus.

20 Claims, 6 Drawing Sheets

(51) Int. Cl.
*G09G 3/36* (2006.01)
*G06T 3/60* (2006.01)
*G06T 3/20* (2006.01)
*G06T 19/00* (2011.01)

(52) U.S. Cl.
CPC .. *G06F 2203/04804* (2013.01); *G06T 19/006* (2013.01); *G06T 2210/24* (2013.01); *G06T 2219/2012* (2013.01)

(56) References Cited

U.S. PATENT DOCUMENTS

| | | |
|---|---|---|
| 8,601,371 B2 | 12/2013 | Dirks et al. |
| 2003/0189586 A1 | 10/2003 | Vronay et al. |
| 2007/0011622 A1 | 1/2007 | Chae et al. |
| 2007/0268122 A1 | 11/2007 | Kow et al. |
| 2008/0162510 A1 | 7/2008 | Baio et al. |
| 2009/0070708 A1 | 3/2009 | Finkelstein |
| 2010/0138784 A1 | 6/2010 | Colley |
| 2012/0084248 A1 | 4/2012 | Gavrilescu |
| 2012/0221722 A1 | 8/2012 | Boberg et al. |
| 2013/0102286 A1 | 4/2013 | Toksvig et al. |
| 2013/0103665 A1 | 4/2013 | Kasterstein et al. |
| 2014/0129961 A1 | 5/2014 | Zubarev et al. |
| 2014/0149903 A1 | 5/2014 | Ahn et al. |
| 2014/0189592 A1 | 7/2014 | Benchenaa et al. |

OTHER PUBLICATIONS

Gadget, Jen, "Notification Bubbles Review", Retrieved from <<https://www.youtube.com/watch?v=jKK-D-_m0-E>>, Jun. 9, 2011, 2 Pages.

Matthewa, "Transform Your Windows Desktop into a Fish Tank with Sim Aquarium [Tip]", Retrieved from <<http://dottech.org/136988/how-to-get-fisk-tank-desktop-windows-xo-vista-7-8/>>, Nov. 28, 2013, 4 Pages.

Nacca, Chris, "Paranoid Android's HALO—Overview", Retrieved from <<https://web.archive.org/web/20130612130903/http://www.youtube.com/watch?v=d5WljHcOyXs>>, Jun. 10, 2013, 4 Pages.

"International Search Report and Written Opinion Issued in PCT Application No. PCT/US2014/069640", dated Aug. 19, 2015, 14 Pages.

INFORMATION SURFACING WITH VISUAL CUES INDICATIVE OF RELEVANCE

CROSS-REFERENCE TO RELATED APPLICATION

This application is a continuation of U.S. patent application Ser. No. 14/139,853, filed on Dec. 23, 2013 and entitled "INFORMATION SURFACING WITH VISUAL CUES INDICATIVE OF RELEVANCE", the entire specification of which is hereby incorporated by reference.

BACKGROUND

An ever-increasing amount of information is presented to users through their computing devices, often inappropriately distracting the user from other tasks that require the user's concentration. Studies have indicated that users are less productive when they are distracted by incoming email messages, which are often only indirectly relevant at best. In addition to emails, users of computing devices are often bombarded with text messages, social media messages, notifications of upcoming or scheduled events, and other like proactively presented information.

Users, however, are becoming increasingly reliant on computing devices to manage their day-to-day lives and interact with their friends and colleagues. Information such as road conditions, travel times, weather forecasts, meeting reminders, to-do lists and the like enable users to set and maintain a schedule and organize the activities that they perform throughout the day. Similarly, emails, textual messages, pictures, video conferences, and other like communications from friends and colleagues provide information that users utilize for both productivity and leisure pursuits.

Consequently, users have been trained to actively seek out the information they desire, while simultaneously filtering out the notifications that are not impactful. Email messages are obtained through a dedicated email application program, text messages are obtained through a dedicated messaging application program, weather is obtained through a dedicated weather application program, traffic information is obtained through a dedicated traffic application program, and so on. In actively seeking out information they desire, users have been trained to utilize these applications individually, and then assimilate the information obtained therefrom in the users' own mind. Similarly, in filtering out notifications that are not impactful, users have been trained to keep track of such notifications, again, in the users' own mind, until such time when the information referenced by the notification does become impactful. Consequently, a notification that an email message is received is presented when that email message is received and the responsibility of remembering to respond to such an email message at a later time is left for the user. Unsurprisingly, users struggle with such inherent inefficiencies. A user running late to a meeting, for example, may forget to check the traffic conditions because the application program through which the user learned of the meeting, and, by proxy, the user's tardiness, is different from the application program through which the user can obtain traffic conditions. Similarly, a user receiving an email at an inopportune time, such as in the middle of a meeting, often forgets to respond to such an email at a later, more opportune time, such as after the meeting has ended, because the notification of the receipt of such an email is presented when the email is received irrespective of whether such a time is an opportune time for the user to consume and respond to such an email message.

SUMMARY

In one embodiment, mechanisms for proactively surfacing information to a user comprise ranking functionality to identify which information to surface. Such ranking functionality can include combination ranking, whereby a higher rank is assigned to information based upon other, contextual information with which such information is associated, and on which the importance of such information can be established.

In another embodiment, information surfaced to a user can provide a vector through which the user can respond or utilize such surfaced information independently of specific application programs having discrete informational focus. In such a manner, a user can be provided access to conceptually linked functionality that can be provided by two or more otherwise independent application programs.

In a still other embodiment, the user interface through which information is proactively provided to a user can be generated so as to provide visual cues which are indicative of, and related to, relevance assigned to the information that is being proactively provided. Such visual cues include sizing, color, intensity, movement, and other like visual attributes. For example, notifications can be presented in a visual environment that stimulates a fluid and organic system. Information can be presented in the form of discrete elements that can be visually presented to mimic such elements as they would appear as if they were viewed from the top, floating in an opaque liquid, where more relevant elements can be generated to appear as if they were floating closer to the surface of such an opaque liquid, while less relevant elements can be generated to appear as if they were sinking further from the surface of such an opaque liquid.

In a further embodiment, the user interface through which information is proactively provided to a user can be generated so as to comprise a single discrete visual element through which information can be proactively presented to the user. Additionally, the user can be provided with the opportunity to define discrete events, whereby information associated with such events can be proactively presented to the user through other discrete elements, such that a one-to-one correspondence exists between such other discrete elements and the discrete events defined by the user.

In a still further embodiment, multiple discrete visual elements can be utilized to proactively present information to a user, with the physical orientation of such discrete elements being utilized to indicate relationship between them. Elements having an explicit relationship can be illustrated as being co-joined, while elements having only an implicit relationship can be illustrated physically proximate to one another. Similarly, elements lacking a relationship can be illustrated as physically distal to one another.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
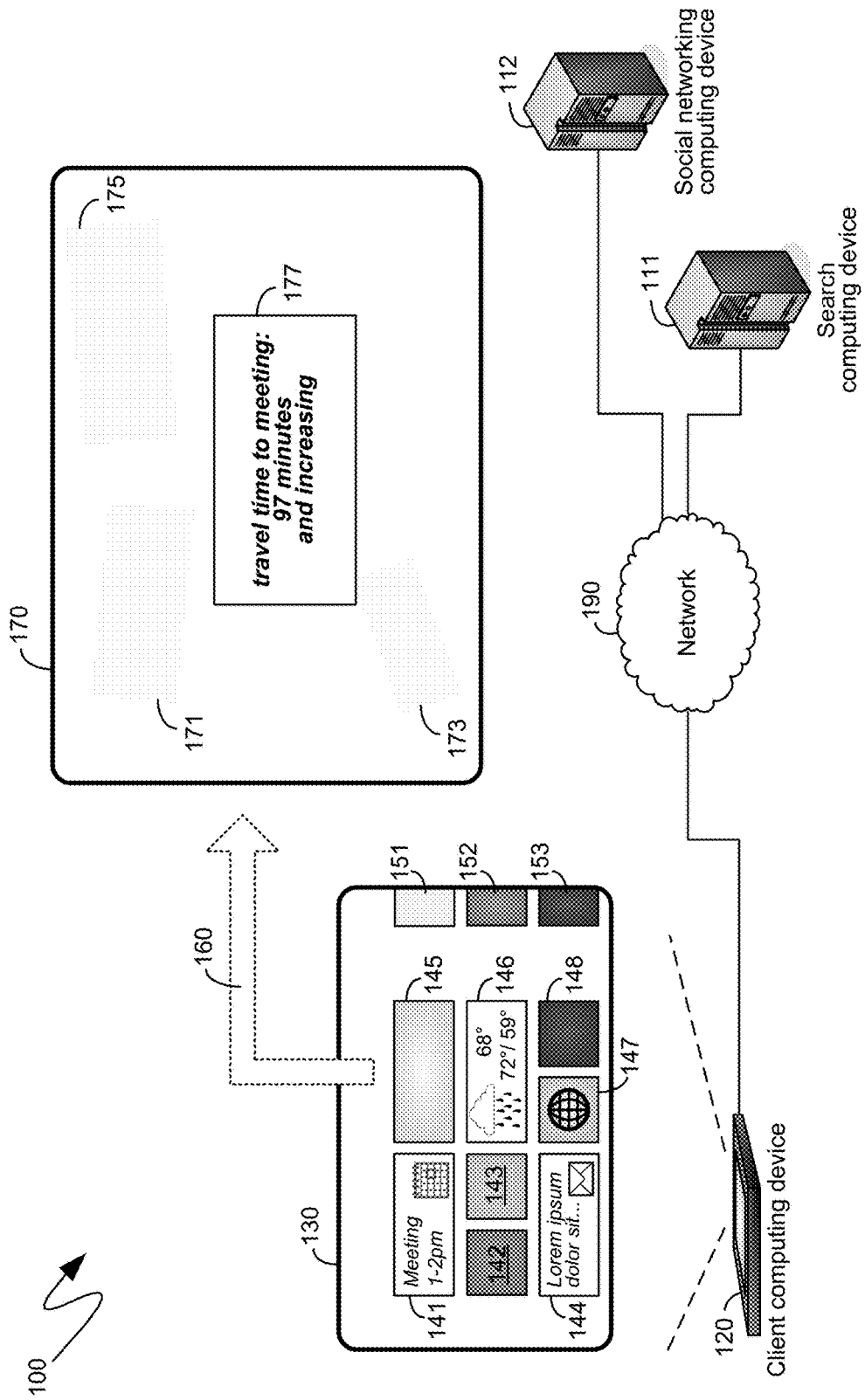
FIG. 1 is a block diagram of an exemplary proactive presentation of information, via a computing device, to a user of that computing device.

The following description relates to the proactive presentation of information, via a computing device, to a user of that computing device. The user interface through which information is proactively provided to a user can provide visual cues which are indicative of, and related to, relevance assigned to the information that is being proactively provided. Such visual cues include sizing, color, intensity, movement, and other like visual attributes. For example, notifications can be presented in a visual environment that stimulates a fluid and organic system. Information can be presented in the form of discrete elements that can be visually presented to mimic such elements as they would appear if they were viewed from the top, floating in an opaque liquid, where more relevant elements can be generated to appear as if they were floating closer to the surface of such an opaque liquid, while less relevant elements can be generated to appear as if they were sinking further from the surface of such an opaque liquid. A single discrete visual element can surface proactively presented information to the user. Alternatively, or in addition, the user can be provided with the opportunity to define discrete events, whereby information associated with such events can be proactively presented to the user through other discrete elements, such that a one-to-one correspondence exists between such other discrete elements and the discrete events defined by the user. If multiple discrete visual elements are utilized to proactively present information to a user, the physical orientation of such discrete elements can be utilized to indicate relationships between such elements. Elements having an explicit relationship can be illustrated as being co-joined, while elements having only an implicit relationship can be illustrated physically proximate to one another. Similarly, elements lacking a relationship can be illustrated as physically distal to one another. Ranking functionality can identify more immediately relevant information to surface to a user. Furthermore, related elements can have their rankings summed such that a higher rank can be assigned to information based upon other, contextual information with which such information is associated, and on which the importance of such information can be established. Information surfaced to a user can provide a vector through which the user can respond or utilize such surfaced information independently of specific application programs having discrete informational focus. In such a manner, a user can be provided access to conceptually linked functionality that can be provided by two or more otherwise independent application programs.

For purposes of illustration, the mechanisms described herein make reference to specific computing environments, such as tablet or mobile phone computing devices, and such as existing tile-based user interfaces. Such references, however, are strictly exemplary and are not intended to limit the mechanisms described to the specific examples provided. Indeed, the techniques described are applicable to any environment within which information is proactively provided to users.

Although not required, the descriptions below will be in the general context of computer-executable instructions, such as program modules, being executed by a computing device. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 120 in the form of a ubiquitous tablet personal computing device. Although the client computing device 120 is illustrated as a tablet computing device, other computing devices, as indicated above, can equally support the mechanisms described. By way of context and background, the client computing device 120 is illustrated as being communicationally coupled to a network 190. Via the network 190, processes executing on the client computing device 120 can access one or more other computing devices and, thereby, take advantage of the data stored thereon, and the processes executing thereon. By way of example, the system 100 of FIG. 1 illustrates a search computing device 111 and a social networking computing device 112 as being communicationally coupled to the network 190 and, consequently, accessible to the client computing device 120 via the network 190.

In one embodiment, the client computing device 120 can generate a user interface 130, such as through an Liquid Crystal Display (LCD) or other display hardware that can be part of the client computing device 120. More specifically, as one example, and as will be understood by those skilled in the art, computer-executable instructions executing on the client computing device 120 can direct individual liquid crystals of the LCD display of the client computing device 120 to either allow light through or block the passage of light. In such a manner, the computer executable instructions can generate a physical ordering of the liquid crystals such that, when the light generated by the backlight of the LCD display passes through such a physical ordering of the liquid crystals, the perception of the user viewing such an LCD display is that of images presented thereon which represent an interface through which the user can interact with the client computing device 120. The presentation of user interface, such as exemplary user interface 130, through other display technologies, all of which are equally utilizable by the mechanisms described herein, can be accomplished in analogous manners that will be known to those skilled in the art.

By way of illustration, the exemplary user interface 130, shown in the system 100 of FIG. 1 as being presented by the client computing device 120, can be a tile-based user interface where each tile represents a single application program executable on the client computing device 120. As will be recognized by those skilled in the art, such a tile-based user interface can be analogous to an icon-based user interface, except that in addition to displaying graphical representation of a file or application program, such as an icon would, an icon-based user interface can include additional information that can be presented within its tiles. For example, the exemplary tile-based user interface 130, shown in FIG. 1, includes a tile 147 that can simply contain an application program icon and, consequently, can enable a user to launch such an application program in nearly the same way that a user would with an icon-based user interface. Conversely, exemplary tile-based user interface 130 can also contain tiles that both enable a user to launch an application program, but also contain additional information associated with such an application program. For example, the tile 141 can enable a user to access calendar or scheduling application program. As illustrated in the exemplary user interface 130, the tile 141 can comprise, not only an icon, or other visual indicator, of the calendar application program, but can also contain calendar information being presented by such a calendar application program, such as the exemplary notification "Meeting 1-2 p.m." shown in FIG. 1. Similarly, the tile 146 can enable a user to access a weather application program and can comprise information being presented by the weather application program, rather than an icon of the weather application program. For example, as shown in FIG. 1, the tile 146 can indicate current weather conditions and a current temperature, as well as forecast high and low temperatures. As yet another example, the tile 144 can enable a user to access any email or messaging application program and can comprise, in addition to an icon representing such an email application program, a snippet of a recently received email.

The tiles of the exemplary tile-based user interface 130 can be grouped together into collections or "screens" of tiles. For example, the tiles 141, 142, 143, 144, 145, 146, 147 and 148 can be part of one collection of tiles, while another set of tiles, such as the tiles 151, 152 and 153, can be part of another set of tiles, the latter having only a small portion thereof shown within the user interface 130 to provide a visual cue that additional sets of tiles can be accessed through appropriate user input, such as a "swipe" touch input. In grouping the tiles together, the tiles can have defined shapes and sizes to facilitate such groupings. For example, the tiles 141, 144, 145 and 146 can be approximately twice the width, but maintaining the same height, as the tiles 142, 143, 147 and 148. In such a manner, the groupings of tiles can be organized in a grid-based manner.

While the exemplary tile-based user interface 130 can proactively surface information to a user, it is limited in that the information that is proactively surfaced to the user surfaced through a tile corresponding to the application program surfacing the information. Thus, if the tile is part of a collection of tiles that is not currently visible, a user will not be made aware of the proactively surfaced information. For example, if the user had interacted with the exemplary user interface 130 so as to display the set of tiles comprising the tiles 151, 152 and 153, then the proactive notifications that can be presented via the tiles 141, 144 and 146 would not be visible to the user until the user returned to that collection of tiles. Additionally, the proactively surfaced information is limited by the capabilities of the corresponding application to proactively surface information. For example, if a mapping application does not comprise the capability to proactively surface information via its specific tile, in the exemplary tile-based user interface 130, then the user will not be able to receive proactive traffic information that could be of benefit to the user.

In one embodiment, therefore, a user interface, such as the exemplary user interface 170, can proactively surface information to a user independently of application limitations and can do so in such a manner to provide the user with information most applicable to the user's current context while minimizing the presentation of less material information. For purposes of illustration, the exemplary user interface 170 is described within the context of a user interface that can be presented by an application program that can be instantiated by user commands initiating through the exemplary user interface 130, described in detail above. To that end, therefore, the arrow 160 is meant to represent the presentation of the user interface 170 as being caused by, and resulting from, a user's instantiation of an application program represented by the tile 145 in the exemplary user interface 130. More specifically, a user utilizing the client computing device 120 can, through the exemplary user interface 130, direct user action to the tile 145, which can result in the instantiation, illustrated by the arrow 160, of an application program generating the exemplary user interface 170.

However, as will be detailed further below, the exemplary user interface 170 is not so limited and can be a user interface through which a user can instantiate application programs and perform other like operating system functions. Thus, in such other embodiments, the exemplary user interface 170 can take the place of the exemplary user interface 130.

Turning to the exemplary user interface 170, in one embodiment the exemplary user interface 170 can proactively provide information to a user through discreet visual elements, such as tiles, where the visual appearance of the tiles changes to indicate the relevance, to the user's current context, of the information being proactively presented. The discreet visual elements that proactively provide information to a user, in the exemplary user interface 170, need not be associated with a specific application program, and, as such, are not limited to a specific subset of information. For example, the exemplary tile 177 can provide the user with information that can have been collected from two separate application programs, such as a calendaring or scheduling application program, which can contain information regarding the time and place of an upcoming meeting, as well as a mapping application program, which can contain information regarding traffic and travel times between a user's current location and the location of the upcoming meeting. Consequently, the exemplary tile 177 can, for example, proactively provide information to a user that is an amalgamation of information collected from disparate sources.

For example, when viewed from an individual, application-centric basis, the mapping application program from which traffic information can be obtained would not have generated a notification to the user since the relevant traffic information may not have been deemed sufficiently extraordinary to warrant proactive presentation to the user, or, alternatively, the relevant traffic information may not be along a route the user would typically take. Similarly, continuing with the above example, when viewed from an individual, application-centric basis, the calendaring or scheduling application program would not likely have generated a notification for the upcoming meeting until some default time prior to the meeting, such as, for example, 15 minutes prior to the meeting.

However, by combining the information that the user has a meeting coming up at a specific time in a specific place, together with traffic information indicating that the user's route from their current location to the place where their meeting will be is such that the user may not arrive for the meeting on time unless the user leaves their current location relatively soon, the sort of notification illustrated by the exemplary tile 177 can be provided. More specifically, as illustrated in FIG. 1, the exemplary tile 177 can provide notification to the user that the traffic along the route between the user and the location of their upcoming meeting is such that the travel time is expected to be "97 minutes and increasing". Furthermore, in the specific example illustrated, the exemplary tile 177 can be provided to the user at a time when more than 97 minutes remain prior to the meeting. Thus, exemplary tile 177 can provide information that can be assembled from multiple, disparate sources.

As will be described in further detail below, the assembling of information from multiple, disparate sources can enable the mechanisms described herein to proactively present information to a user that the user would not otherwise have received. For example, by combining information indicating that a user has a upcoming meeting, together with information identifying the user's current location, and information regarding traffic or travel time between the user's current location and the meeting, as well as information indicative of a current time, the mechanisms described herein can identify that the user should be informed of the travel time between their location and the location of their meeting sufficiently prior to the meeting to enable the user to arrive at the meeting on time. Individually, as indicated, each of such discrete pieces of information may not have been sufficient to trigger a notification to the user. When combined, however, they reveal the need for the user to be notified, and that such a notification becomes more urgent, or more relevant, as the time approaches by which the user must leave in order to arrive at the meeting on time, given the traffic information obtained. In such a manner, the individual tiles of the exemplary user interface 170, such as the exemplary tile 177, need not be associated with any one specific application, such as are the tiles of the exemplary user interface 130. Instead, the tiles of the exemplary user interface 170 can provide notifications that align, not with specific applications, but rather with activities and events as conceptualized by a human user independently of the informational boundaries established by individual application programs.

In one embodiment, information can be proactively surfaced through a user interface, such as the exemplary user interface 170, within which the graphics utilized to visually present the information can provide visual cues indicative of the determined relevance of such information, given the user's current context. For example, information can be proactively presented, in the exemplary user interface, via tiles, such as the exemplary tiles 171, 173, 175 and 177. The color, size, shape, intensity, transparency, visibility, animation, and other like visual attributes of such tiles can be varied in accordance with the determined relevance of the information being proactively presented within such tiles. In such a manner, the proactive presentation of information is no longer limited to a binary condition where such information either is, or is not, presented. Instead, through such visual cues, which can be achieved graphically in the manner described in detail below, information can be proactively provided in varying degrees, corresponding to the determined relevance of such information.

To more cohesively generate visual attributes that can act as cues for a content's relevance, various visual paradigms can be employed which can be familiar to a user and can, thereby, be more easily comprehended and utilized by a user. For example, in one embodiment, a visual paradigm simulating a fluid and organic system can be utilized. More specifically, the tiles through which information can be proactively presented to the user, in the exemplary user interface 170, can move in a manner evocative of content floating, and rising and sinking, in a viscous, opaque liquid. The visual appearance of the tiles, in the exemplary user interface 170, can be continually modified such that the visual appearance of the tiles is evocative of content floating upward, or sinking downward, in an opaque liquid, with more relevant content floating upward, and less relevant content sinking downward. Thus, as shown in FIG. 1, the tile 177 can be clearly presented as if it was floating on top of such an opaque liquid, with none of the opaque liquid being between the tile and the perspective of the user. By contrast, tiles 171, 175 and 173 are illustrated as increasingly appearing dimmer and more grayed out to be evocative of tiles sinking downward in the opaque liquid, such that an increasing amount of the opaque liquid is positioned between the tiles and the perspective of the user.

As will be recognized by those skilled in the art, known graphical mechanisms exist for generating such visuals on displays connected to computing devices. For example, alpha values associated with the pixels of such tiles can be adjusted to create the visual appearance that the content of such tiles is being viewed through thick glass, opaque liquid, or other like light distorting media. As another example, the color values associated with the pixels of such tiles can be modified from pre-existing color values to create the visual appearance that the content of such tiles is being viewed through light distorting media. More specifically, the pixels of a given tile can be assigned specific color values corresponding to a selected color of such a tile. Subsequently, the color values of those pixels can be randomly interchanged with other pixels that are proximate thereto and the intensity of such color values can be decreased. Such random interchanging of pixel values, when combined with corresponding color intensity decreases can create a visual effect akin to that of viewing content through a light distorting media.

Often, existing graphics libraries of operating systems provide functionality for generating various visual effects. More specifically, and as will be recognized by those skilled in the art, known mathematical operations can accept, as input, color values of an individual pixel or a set of pixels and can output resulting color values for those one or more pixels that, when viewed by a user, result in a visual change that is evocative of specific visual effects, such as the viewing of content through frosted glass, the viewing of content through water, viewing of content as if it was backlit, and other like visual effects. Typically, such functionality is accessed by selecting an appropriate distortion action and providing some or all of an initial image, such as a tile of the given color and textual notification, as input. The resulting output can be a tile that appears differently, due to the performance of the distorting function, to evoke a specific visual effect, such as the viewing of the original tile through a depth of opaque liquid.

Figure 2:
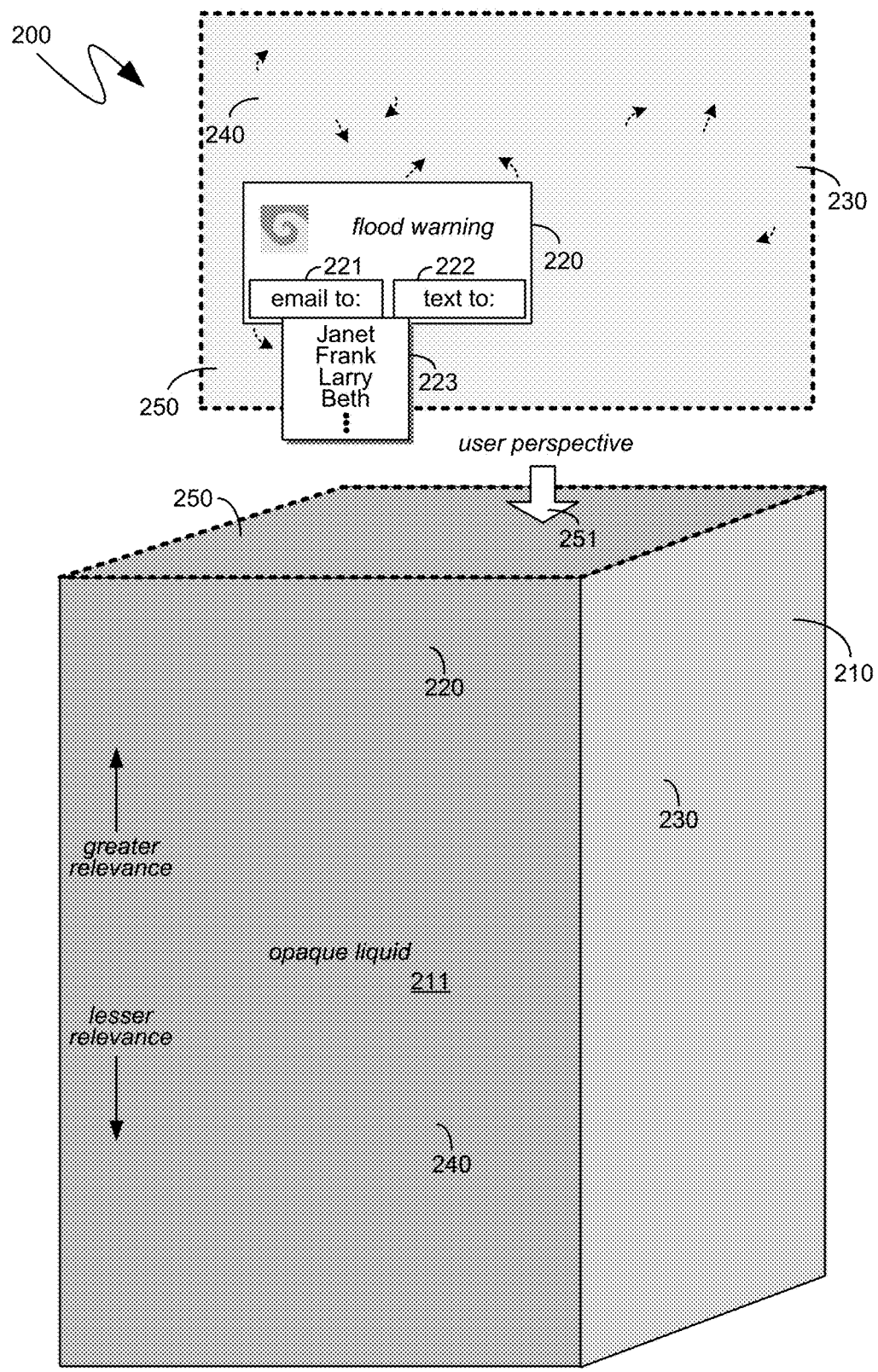
FIG. 2 is a block diagram of an exemplary user interface for proactively presenting information, via a computing device, to a user of that computing device.

Turning to FIG. 2, the system 200 shown therein provides a graphical representation of one of the visual effects contemplated. More specifically, the visual effects contemplated can be conceptualized in the form of tiles floating or sinking within a container 210 of opaque liquid 211, as viewed from above. Thus, as illustrated by the system 200 of FIG. 2, the user perspective 251 that is meant to be emulated by the contemplated user interface is that of a user looking through the top portion 250 into the container 210. The top portion 250 of the container 210 is shown in FIG. 2 in a dashed outline and a two-dimensional view, representing the user's perception 251 through the top portion 250, as illustrated above the three-dimensional representation of the container 210 and as also illustrated in a dashed outline. Objects bearing identical reference numerals in FIG. 2 are merely multiple representations of the same object, viewed either in a three-dimensional representation, or in two-dimensional projection from a single perspective.

As illustrated by the arrows denominated "greater relevance" and "lesser relevance", in one embodiment, the visual presentation of a contemplated user interface is meant to mimic tiles rising or lowering within the container 210 of the opaque liquid 211, where tiles having lesser current relevance, such as, for example, the exemplary tile 240, can sink to the bottom of the container 210 where, when viewed through the top 250 of the container 210, such tiles can be, in essence, invisible due to the opaque liquid 211 that would be positioned between such tiles and the user's perspective 251, while tiles having greater current relevance, such as, for example, the exemplary tile 220, can float to the top of the container 210 where, when viewed through the top 250 of the container 210, such tiles can be fully visible with little to no intervening opaque liquid 211 between such tiles in the user's perspective 251 to distort the user's view of such tiles. Thus, as illustrated by the system 200 of FIG. 2, the exemplary tile 220 can be viewed clearly when seen through the top 250 of the container 210, while the exemplary tile 230 can be viewed less clearly when seen through the top 250 of the container 210, and the exemplary tile 240 can, when viewed through the top 250 of the container 210, be essentially invisible or faded into the background.

To generate such a user interface, various graphical aspects of the tiles presented in such user interface can be modified to graphically simulate the above described effects. For example, tiles that are meant to be evocative of tiles that have sunk to lower positions of the container 210 can be graphically drawn, in the exemplary user interface, so as to appear grayed-out, blended into the background, or other like graphical effects. Such effects can, as will be recognized by those skilled in the art, be generated through known computer graphics techniques such as, for example, the positioning of intermediate graphical elements adjusting the alpha values of such graphical elements and provide for defined levels of transparency similar to the levels of transparency that would be provided by the opaque liquid 211. Alternatively, or in addition, existing graphical functions or libraries, such as would be provided by an operating system, can be utilized to generate the aforementioned graphical effects, such as by selecting an appropriate graphical effect function from such libraries and providing to it, as input, one or more tiles. The resulting output can be tiles, such as the exemplary tiles 230 and 240, which can be visually perceived by the user in a manner evocative to such tiles being viewed through some amount of opaque liquid.

In one embodiment, in addition to the visual effects directed to the appearance of the tiles presented in the exemplary user interface, dynamic motion can be added to the tiles presented in the exemplary user interface to simulate how physical objects floating or suspended in a liquid would move. For example, in such an embodiment, as illustrated by the dashed arrows in FIG. 2, the tiles shown in the exemplary user interface can be rendered so that they appear to be moving, either translating across from one location to another, rotating around axis through such tiles, or combinations thereof. Such slight movements or motion of the tiles can further visually engage the user and can further convey the organic and dynamic nature of the system by which the user proactively receives information and notifications. Additionally, the movements or motion of the tiles can convey relevance in a manner similar to that described above with respect to visual appearance. For example, tiles exhibiting a greater amount of motion can comprise content deemed more relevant than tiles whose movement is less pronounced.

Turning to the content of the tiles themselves, as illustrated previously, and described in detail above, in one embodiment the tiles, such as the exemplary tiles 220, 230 and 240 shown in the system 200 of FIG. 2, can comprise information that can be proactively presented to a user. Such information can be proactively presented to a user by, for example, the tile comprising such information being graphically illustrated, within a user interface, in a manner evocative of an object rising in a container of opaque liquid, such as that shown in FIG. 2. As also illustrated and described previously, the information that is proactively presented by such tiles need not be associated with only a single application program, and can, instead, be the result of a combination of information collected from multiple, separate and independent sources.

In addition to proactively providing information, the graphical elements within which such information is proactively provided, such as the aforementioned tiles, can provide the user with an entry vector to one or more applications through which the user can access functionality or information associated with the information that was proactively provided to the user. For example, user action directed to a tile can result in the instantiation of an application program associated with the information that was proactively presented to the user through the tile. In one embodiment, as will be described in further detail below, the information proactively presented to a user through a single tile can change over time. For example, a single tile can provide the user with a notification about an upcoming meeting and then, subsequently, after such a notification would no longer be useful or relevant to the user, the information proactively presented through that same tile can change to, for example, information alerting the user to a weather event. As the information that is proactively presented to the user through the tile changes, the application with which the tile is associated, likewise, changes. Returning to the above example, a tile proactively providing the user with a notification about an upcoming meeting can, in response to user action directed to such a tile, instantiate a scheduling or calendaring application program through which the user can obtain more information about such an upcoming meeting, or can access functionality relevant to such an upcoming meeting such as, for example, functionality directed to changing the time of such a meeting, or sending a response that the user is not attending such a meeting. Staying with the above example, that same time, when subsequently proactively providing information alerting the user to a weather event can, in response to user actions directed to it, instantiate a weather application program through which the user can obtain additional information regarding the weather events to which the user was alerted.

Because, as described, the mechanisms for proactively presenting information to a user can act as entry vectors by which users can access application programs, in one embodiment, the user interface described herein can be provided by operating systems or other like application instantiation platforms. In such an embodiment, in addition to providing the user with access to application programs via the traditional mechanisms, access to application programs can also be surfaced proactively, such as via tiles, in a manner analogous to that described in detail above with respect to the proactive presentation of information. Thus, for example, as the user was preparing to drive home, a mapping application with real-time traffic data could be proactively provided to the user by a tile, with its graphical appearance, in the user interface, being evocative of a physical object rising in a container of opaque liquid. As another example, a user interacting with a webpage to purchase airline tickets to another city can be proactively provided with access, such as via a tile, to an application program that can enable the user to search for, and make reservations at, restaurants in the city to which the user is traveling.

In one embodiment, in addition to proactively providing information to a user, the graphical element through which such information is proactively provided, such as the aforementioned "tile", can also enable the user to directly perform one or more actions related to the information that is proactively provided thereby. In such a manner, especially within the context where the information proactively provided by a tile may not specifically associate with only a single application program, the user can be provided with the opportunity to perform actions related to such proactively provided information without searching for and manually instantiating one or more application programs. For example, the exemplary tile 220 shown in FIG. 2 can provide the user with, as one example, a flood warning affecting the user's current location. In such an example, to the extent that the tile 220 could act as a vector by which a user could access additional information or functionality through an application program, the most likely application program associated with such a flood warning would be a weather application program. However, there may be one or more tasks that the user may wish to take with respect to the exemplary flood warning that are not associated with the weather application program. For example, given such a warning that likely affects more individuals than only the user, the user may seek to share such a warning with others. Consequently, the exemplary tile 220 can provide access to functionality, such as via the user interface elements 221 and 222, by which the user can directly perform a function, such as sharing the warning that was proactively presented to the user with others without needing to instantiate other application programs. In the specific example illustrated in FIG. 2, selection of the user interface element 221 can generate a further user interface element 223, such as in the form of a drop-down menu, by which the user can select one or more individuals to whom the notification, presented by the exemplary tile 220, can be directed.

The proactive presentation of information, via the user interfaces described herein, can function in a task-centric, as opposed to application-centric, manner. More specifically, and as described previously, existing notification mechanisms are limited by a subset of information to which the application programs generating such notification mechanisms are limited. For example, a notification generated by a calendaring application program is limited by the subset of information to which such a calendaring application program is directed, namely only scheduling information. As such, those notifications can comprise information regarding upcoming events that the user has scheduled, but cannot provide any additional information that the user would consider pertinent to the task of attending such upcoming events. Thus, in such existing systems, a proactive notification of an upcoming event would be based only on the time remaining until such an event, because that is the only information available to the calendaring application. Consequently, such proactive notification would be provided irrespective of the user's context and, consequently, could be provided in situations where such notification is not useful to the user. For example, if the user is already at the location at which the upcoming event will take place, informing the user of the upcoming event the default 15 minutes prior to such an event can result in the user receiving that notification prior to it becoming relevant to the user. Conversely, as another example, if the user is located at some distance from the upcoming event, such that it would take the user an hour or more to arrive at the location of the upcoming event, than informing the user of the upcoming event a default 15 minutes prior to such an event can result in the user receiving that notification long after its relevance had come and gone.

By contrast, the mechanisms described herein take into account user context and information from multiple sources to proactively generate notifications that are not limited to the information obtained only from one source, such as a single application program. Consequently, the proactive notifications provided by the system described herein are not application-centric, in that they are not limited by the subset of information available only to a single application program. By contrast the proactive notifications provided by the system described herein can be thought of as being task-centric in that they determine the relevance of information to a user, and proactively provide notifications in accordance with such relevance, based upon how a human user would approach a given task irrespective of the precise mechanism by which information associated with such a task would be obtained. Thus, as illustrated by the example illustrated previously, a user can be proactively notified about traffic conditions between that user's location and the location of an upcoming event at a time sufficiently prior to the upcoming event to enable the user to arrive on schedule despite the traffic. As to be recognized, such a notification can combine traffic information, such as that commonly provided by mapping application programs, and scheduling information, such as that commonly provided by scheduling or calendaring application programs. Furthermore, the relevance of such a notification can be based on a combination of such disparately obtained information. More specifically, neither the traffic information, when considered independently of the upcoming event, nor the upcoming event, when considered independently of the traffic information, would warrant sufficient relevance or urgency to provide a proactive notification. By contrast, when considered together, a determination can be made that informing the user of the upcoming event and the travel time to the upcoming event, at a time sufficiently prior to the upcoming event to enable the user to arrive to the upcoming event on time, can be sufficiently relevant to cause the proactive presentation of the notification.

With reference, again, to the system 200 of FIG. 2, the container 210 is illustrated as comprising exemplary tiles 220, 230 and 240 that float or sink within the opaque liquid 211 in the container 210 in accordance with the relevance assigned to the information being proactively presented by such exemplary tiles 220, 230 and 240. As indicated previously, in one embodiment, a user interface for proactively providing information to a user can be physically generated, on a display device communicationally coupled to a computing device, such that, when viewed by a user, images of such a user interface are evocative, to the user, of the floating and sinking of the exemplary tiles 220, 230 and 240 in the container 210 of opaque liquid 211 when viewed through the top 250. Returning to the above example of a proactive notification of the travel time between a user's current location and a location of a subsequent event, at a time sufficiently prior to the subsequent event to enable the user to arrive to the subsequent event on time, a tile presenting such a proactive notification can be conceptualized as floating upward within the container 210 of the opaque liquid 211 due to the aforementioned combination of disparate sources of information. More specifically, a tile, such as the exemplary tile 230 shown in FIG. 2, can have initially comprised some subset of the aforementioned information such as, for example, the fact that an upcoming event was scheduled by the user.

As additional information is obtained, such as, for example, the user's current location, the current time, and traffic conditions between the user's current location and the location of the upcoming event, the exemplary tile 230 can be conceptualized as rising within the container 210 of the opaque liquid 211 since its relevance to the user is increasing. The informational content being presented by such an exemplary tile 230 can, likewise, change. For example, such informational content can change from merely informing the user of an upcoming event, to, more specifically informing the user of the travel time between the user's current location and the upcoming event, optionally with guidance information such as instructions to the user that they need to leave very soon in order to be able to arrive at the upcoming event on time. As the time approaches by which the user must leave in order to arrive at the upcoming event on time, given known travel time information, the exemplary tile 230 can be conceptualized as floating near the top 250 of the container 210 such that little to no opaque liquid 211 would be present between the user's perspective 251 through the top 250 of the container 210 and the exemplary tile 230. Thus, as presented within a user interface physically generated on a display device communicationally coupled to a computing device, such a tile can be a graphical object that is shown as becoming clearer and more distinct as the relevance of the information provided by such a tile increases. For example, alpha values of intermediate graphical elements can be continually modified to provide increasing transparency, thereby generating a graphical visual effect evocative of a tile rising in a container of opaque liquid when seen through the top of such a container. Other known graphics processing can be likewise applied to generate visual effects evocative of the described tile rising in a container of opaque liquid.

The above described visual paradigm, evocative of tiles, viewed from above, as they float and sink in a container of opaque liquid, is but one visual paradigm that can be utilized to convey multiple levels of urgency, relevancy, or other measures of the relevance of the information that is proactively presented to a user. More specifically, and as stated above, the mechanisms described herein enable the proactive presentation of information with visual cues that can convey a determined relevance, and, as such, represent an improvement over traditional notification mechanisms that are binary in nature and have only two states: either presenting a notification or not presenting a notification. To that end, the above described visual paradigm provides the user with visual cues, through the graphical attributes of the tiles that proactively provide information to user, which are indicative of the determined relevance of the information that is proactively provided by such titles. Other visual paradigms can equally vary the graphical representation of tiles, or other vehicles by which information is proactively presented, in order to convey relevance. More specifically, visual cues such as the color of the tile, the shape of a tile, the intensity of the colors of the tile, the transparency of a tile, the font used for the text of a tile, and other like visual cues can be equally utilized, either individually or in combination, to convey relevance of the information proactively presented via such tiles.

For example, another visual paradigm that can be equally generated by the mechanisms described herein can be a visual paradigm evocative of tiles hovering in a room filled with fog, smoke, or other like opaque gaseous material. As the importance or relevance of the information contained in a tile increases, such tiles are generated in a graphical manner evocative of tiles approaching a user in such a smoke-filled room, while tiles containing information whose importance or relevance is decreasing can be presented in a graphical manner evocative of tiles disappearing into the distance in a smoke-filled room. In such a visual paradigm, much like in the visual paradigm of the tiles floating and sinking in an opaque liquid, known graphical techniques and functions can be applied to graphically distort tiles so as to make them visually appear as if they are being viewed through some amount of smoke, fog, or other like opaque gaseous substance.

In one embodiment, a visual paradigm need not be evocative of physical constructs or items. For example, a simple visual paradigm that is equally applicable, and can be equally generated by the mechanisms described herein, can be a visual paradigm in which the importance or relevance of information contained in the tile is merely proportional to the size of the tile, the intensity of the colors of the tile, the transparency of the tile or combinations thereof. In such a simplified visual paradigm, for example, larger tiles, or tiles having brighter colors, can proactively present information that is deemed to be highly relevant, or very important, while smaller tiles, or tiles having duller colors, can proactively present information determined to be less relevant. Similarly, tiles proactively presenting important information can be clearly visible, while tiles proactively presenting less important information can be graphically drawn so as to be mostly transparent.

As indicated previously, in addition to the static graphical techniques described, dynamic graphical techniques can equally be applied to convey relevance, such as importance or urgency. For example, as indicated previously, tiles that are proactively presenting information can be graphically generated so that they appear to be moving, either with translational motion, rotational motion or combinations thereof. Such motion can be evocative of physical realities, such as tiles floating in a liquid, and can, thereby, aid in the presentation of a visual paradigm, but such motion can also be utilized convey relevance. For example, tiles having a greater range of translational motion can be more eye-catching and can, consequently, utilized to convey the greater determined relevance of the information being proactively presented thereby. As another example, tiles having a greater range of rotational motion can, similarly, be utilized to convey a greater level of relevance. In one embodiment, the whole tile need not graphically move. Instead, in such an embodiment, the textual aspects of such a tile, which can textually present information to a user, can remain static and fixed in the graphical user interface. The edges, or borders, of such a tile, however, can exhibit translational motion, rotational motion, or combinations thereof. For example, the edges of a tile can be graphically illustrated such that the tile appears to be vibrating or shaking. Such motion of the edges of the tile can, likewise, be visually indicative of the determined relevance of the information proactively presented by such a tile. For example, a tile whose borders exhibit movement that is associated with high energy, such as a high frequency vibration, can be utilized to convey highly relevant or important information.

The proactive presentation of information to a user via the above described user interfaces can, in one embodiment, be provided through a limited set of tiles. More specifically, an initial single tile can proactively provide all information deemed relevant to the user, with the information being proactively presented to the user via that single initial tile continually changing as additional data is received. For example, a single initial tile could provide the user with the above described flood warning notification. As such notification became less relevant, including, for example, simply due to the passage of time, the single tile proactively providing such a notification can be graphically shown to the user, within the user interface, in a manner visually evocative of how such a tile would appear when seen from the top of a container of opaque liquid as such a tile sinks lower into the container. As additional data is received and obtained, such as, for example, the aforementioned traffic information, such a single initial tile could change the information it was proactively providing to the user to, for example, now comprise the travel time between the user's current location and the location of an upcoming event. Additionally, such a single initial tile could be graphically shown to the user, within the user interface, in a manner visually evocative of how such a tile would appear when seen from the top of a container of opaque liquid as such a tile floated higher and higher within the container. As described previously, such a graphical presentation of the tile can include making the tile and its content visually appear more clear, larger, having greater or different colors, and other like visual effects.

The above described single tile can be associated with the user so as to proactively present, to the user, any information deemed relevant to the user's current context. In one embodiment, additional tiles can be associated with discrete aspects of the user's life such as, for example, specific events or projects in which the user is engaged. Such tiles can be automatically created by automatically identifying specific aspects of the user's life that warrant individual treatment, or, alternatively, or in addition, such tiles can be created based upon explicit instructions received from the user. For example, a user planning to go on a trip can have one tile proactively present information associated with the user's trip while another tile, such as the aforementioned single initial tile, can proactively present any information not categorized as being associated with the user's trip. By way of illustrative example, the former tile can, while the user is traveling on their trip, proactively provide weather forecasts for the user's current location, while the latter tile can continue to proactively provide notifications such as the arrival of important emails from business colleagues and other like non-trip related information.

Figure 3:
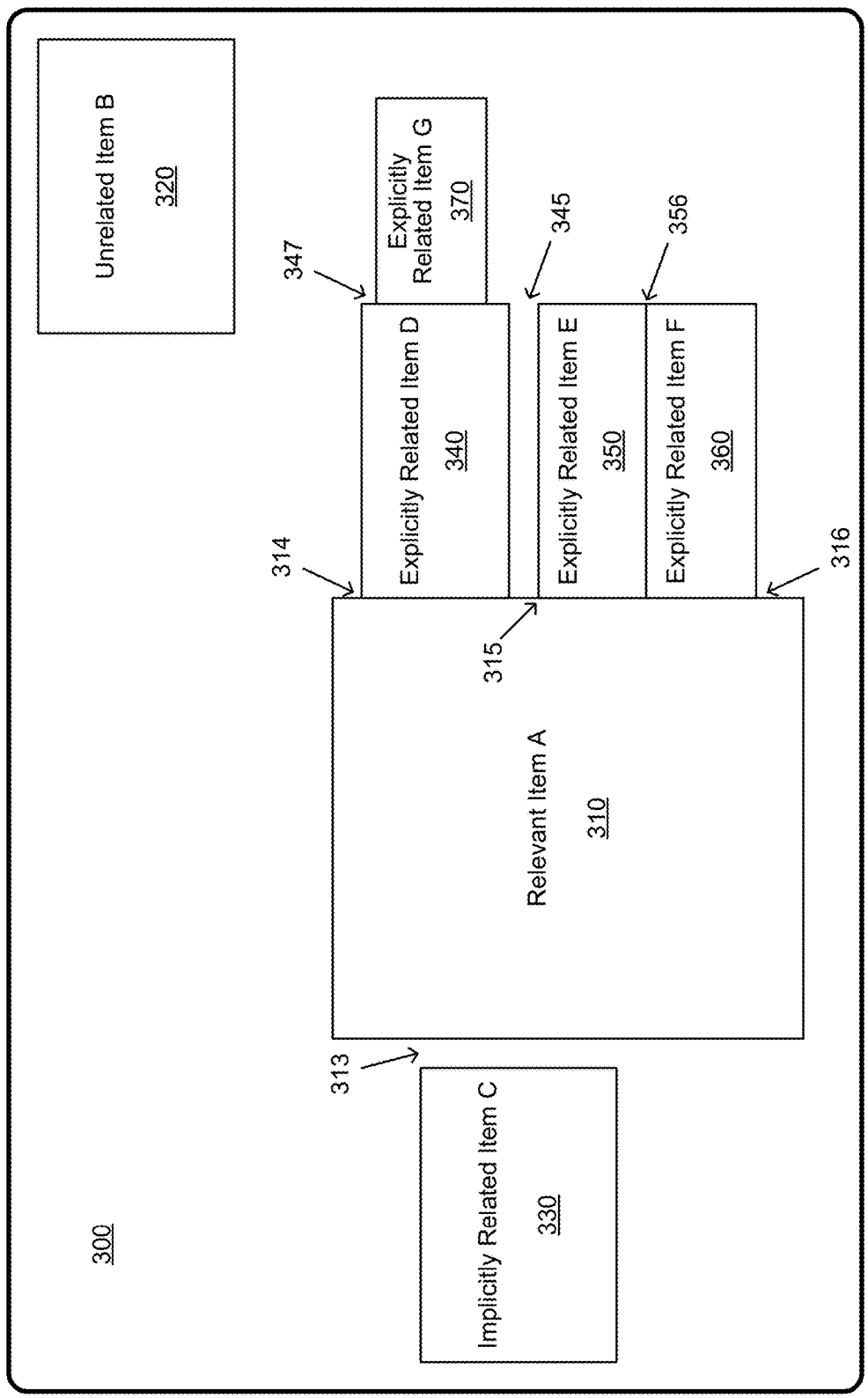
FIG. 3 is a user interface diagram of an exemplary user interface for proactively presenting information, via a computing device, to a user of that computing device.

Turning to FIG. 3, an exemplary user interface 300 is shown illustrating one mechanism by which the visual arrangement of the surfacing of the above described tiles can be utilized to convey relationships among information surfaced on such titles. To illustrate such contemplated visual cues, the exemplary user interface 300 contains an initial tile 310 in reference to which the descriptions below will be made. Tiles proactively presenting information that is categorized as being unrelated to the information proactively presented the tile 310 can be displayed away from the tile 310 such as is exemplified by tile 320 in the exemplary user interface 300. By contrast, tiles proactively presenting information that is categorized as being related to the information proactively presented by the tile 310 can be displayed proximate to the tile 310. More specifically, in one embodiment, tiles proactively presenting information that is categorized as being implicitly related to the information proactively presented by the tile 310 can be displayed proximate to the title 310, but not touching the tile 310. Thus, as illustrated by an exemplary user interface 300 of FIG. 3, tile 330 can proactively provide information that is categorized as being implicitly related to the information that was proactively provided with the tile 310 and, as such, the tile 330 can be presented proximate to the tile 310, except with a gap 313 between the tile 330 and the tile 310. By contrast, tiles proactively presenting information that is categorized as being explicitly related to the information proactively presented by the tile 310 can be displayed both proximate to the tile 310 and touching the tile 310. Thus, as illustrated by an exemplary user interface 300 of FIG. 3, tile 340 can proactively provide information that is categorized as being explicitly related to the information that was proactively provided with the tile 310 and, as such, the tile 340 can be presented proximate to the tile 310 and touching the tile 310 such that the tile 310 and the tile 340 share an edge 314.

In one embodiment, the above described visual indicators of the relationship between information proactively presented in multiple tiles can be repeated in a recursive manner. For example, in the exemplary user interface 300 of FIG. 3, the tile 340, by sharing an edge 314 with the tile 310, is illustrated as proactively presenting information that is deemed to be explicitly related to the information that is being proactively presented by the tile 310. Recursively, in a similar manner, another tile 370, sharing an edge 347 with the tile 340, can proactively present information that is deemed to be explicitly related to the information that is being proactively presented by the tile 340. If three or more tiles proactively present three different sets information, each of which are deemed to be explicitly related to the others, then the tiles can be presented proximately to and sharing an edge with each other. For example, tiles 310, 350 and 360 are each presented proximate to the others and each sharing an edge with the others such as, for example, the edge 315 shared between the tiles 310 and 350, the edge 316 shared between the tiles 310 and 360, and the edge 356 shared between the tiles 350 and 360. Additionally, the location of the tiles 350 and 360 along an edge of the tile 310 can illustrate a potential relationship between the information proactively presented by, for example, the tile 350, and the information proactively presented by the tile 340. More specifically, if the information proactively presented by the tile 350 is implicitly related to the information proactively presented by the tile 340, then the tile 350 can be positioned proximate to, but with a gap 345, between it and the tile 340.

Visual cues to indicate relationship, such as those described in detail above, can include, not only the static aspects described above, but also dynamic aspects that can be based on graphical motion of corresponding tiles. More specifically, tiles conveying information that is deemed to be related can move in a manner evocative of such tiles having a physical attraction to one another, such as two magnets. Thus, for example, in the exemplary user interface 300 FIG. 3, if the tile 310 were to exhibit motion, such as translational motion, rotational motion, or combinations thereof, the tiles 340, 350 and 360 could move in an analogous manner such that they remained graphically joined with the tile 310. Similarly, if the tile 310 were to respond to user action, such as a user moving such a tile to a different portion the exemplary user interface 300, then the tiles 340, 350 and 360 could similarly be graphically represented as moving with the tile 310. By contrast, tiles comprising information that is deemed to be unrelated can be graphically represented as actively seeking to maintain a distance between them, such as to magnets whose magnetic fields cause them to repel one another. Thus, for example, if the tile 310 were to exhibit motion, than the tile 320 could exhibit a corresponding motion by which a spacing between the tiles 310 and 320 was maintained, while keeping both tiles within the exemplary user interface 300.

Additionally, as illustrated by the exemplary user interface 300 of FIG. 3, in other embodiments, the relevance and relationship of information proactively presented to a user can be conveyed without resorting to graphical representations evocative of objects in a three-dimensional space. In such other embodiments, the size, shape, location, coloring, color intensity, and other like graphical attributes of tiles can equally convey the relevance or importance of information proactively presented by such tiles. For example, as illustrated by the exemplary user interface 300 of FIG. 3, the size of the exemplary tile 310 can convey that the information proactively presented by the exemplary tile 310 has a greater relevance to the user than, for example, the information proactively presented by the exemplary tile 320. As indicated, other two-dimensional graphical attributes, such as tile shape, relative location within a user interface, the coloring in color intensity of a tile, and other like two-dimensional graphical attributes can be utilized to convey the relevance or importance of information practically presented by such tiles without resorting to graphics evocative of three-dimensional objects or three-dimensional movement.

Figure 4:
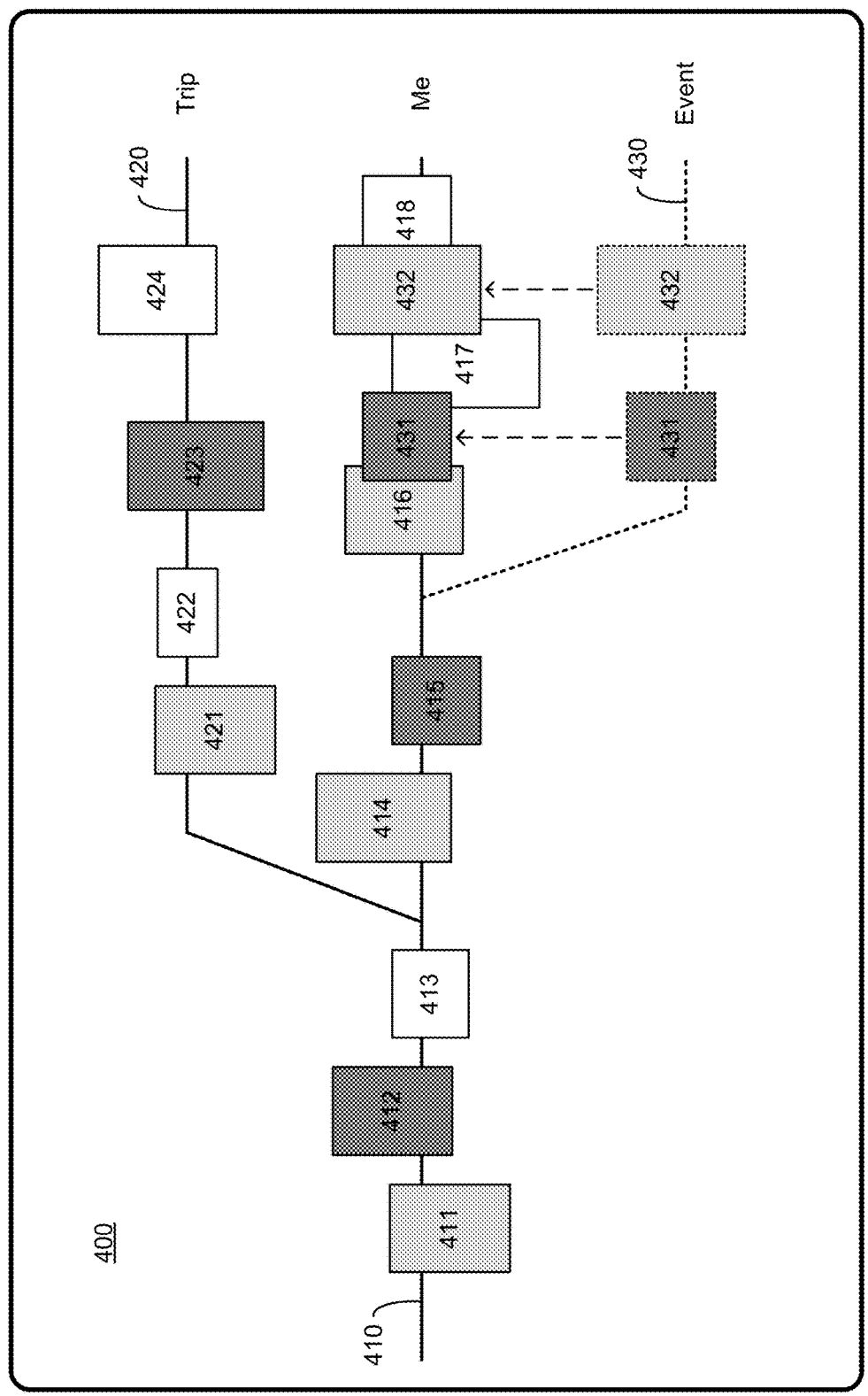
FIG. 4 is a user interface diagram of an exemplary user interface for modifying how information is proactively presented, via a computing device, to a user of that computing device.

Turning to FIG. 4, the exemplary user interface 400 shown therein illustrates one visualization that can enable a user to define how information is proactively presented, such as via the tiles described in detail above. More specifically, the exemplary user interface 400 comprises a timeline-based approach to visualize categorization of information. Thus, the exemplary user interface 400 comprises a timeline 410 that can represent a default and primary category of information comprising any information relevance to the user that is not otherwise more appropriately categorized in other categories that can be explicitly defined by the user. Along such a timeline 410, discrete collections of information about specific events, occurrences and other like data can be visualized in the form of the individual discrete collections of information 411, 412, 413, 414, 415, 416, 417 and 418. Each of such discrete collections of information can have triggered, or can trigger in the future one or more proactive notifications to the user, or can have adjusted, or can adjust in the future, the relevance of various notifications.

Through such a timeline-based approach, the user can define explicit constructs about which the user desires to receive information independently of the information proactively provided through the default timeline 410. Such explicitly defined constructs can then be visualized, in the exemplary user interface 400 of FIG. 4, as branches off of the main timeline 410 such as, for example, the branches 420 and 430. Discrete collections of information deemed to be associated with, or relevant to, such explicitly defined constructs can then be associated with the branches 420 and 430 of the timeline 410. For example, the individual discrete collections of information 421, 422, 423 and 424 can be associated with the branch 420 and the discrete collections of information 431 and 432 can be associated with the branch 430. By explicitly defining such constructs, the user can be proactively provided with information about such constructs through tiles independently of tiles proactively providing other information. In such a manner, the user can define how information is proactively presented to them and can specify how many different tiles or other like presentation vectors are utilized to proactively present such information.

In one embodiment, if a user were to delete an explicitly defined construct, the discrete collections of information associated with such an explicitly defined construct can revert back to the default timeline 410. For example, in the exemplary user interface 400, the branch 430 is illustrated in dashed lines to indicate that the user has previously defined such a construct, and then subsequently deleted it. As part of such a deletion, the discrete collections of information 431 and 432 that were previously associated with the branch 430 can revert back to the default timeline 410, as illustrated by the arrows shown in FIG. 4.

Figure 5:
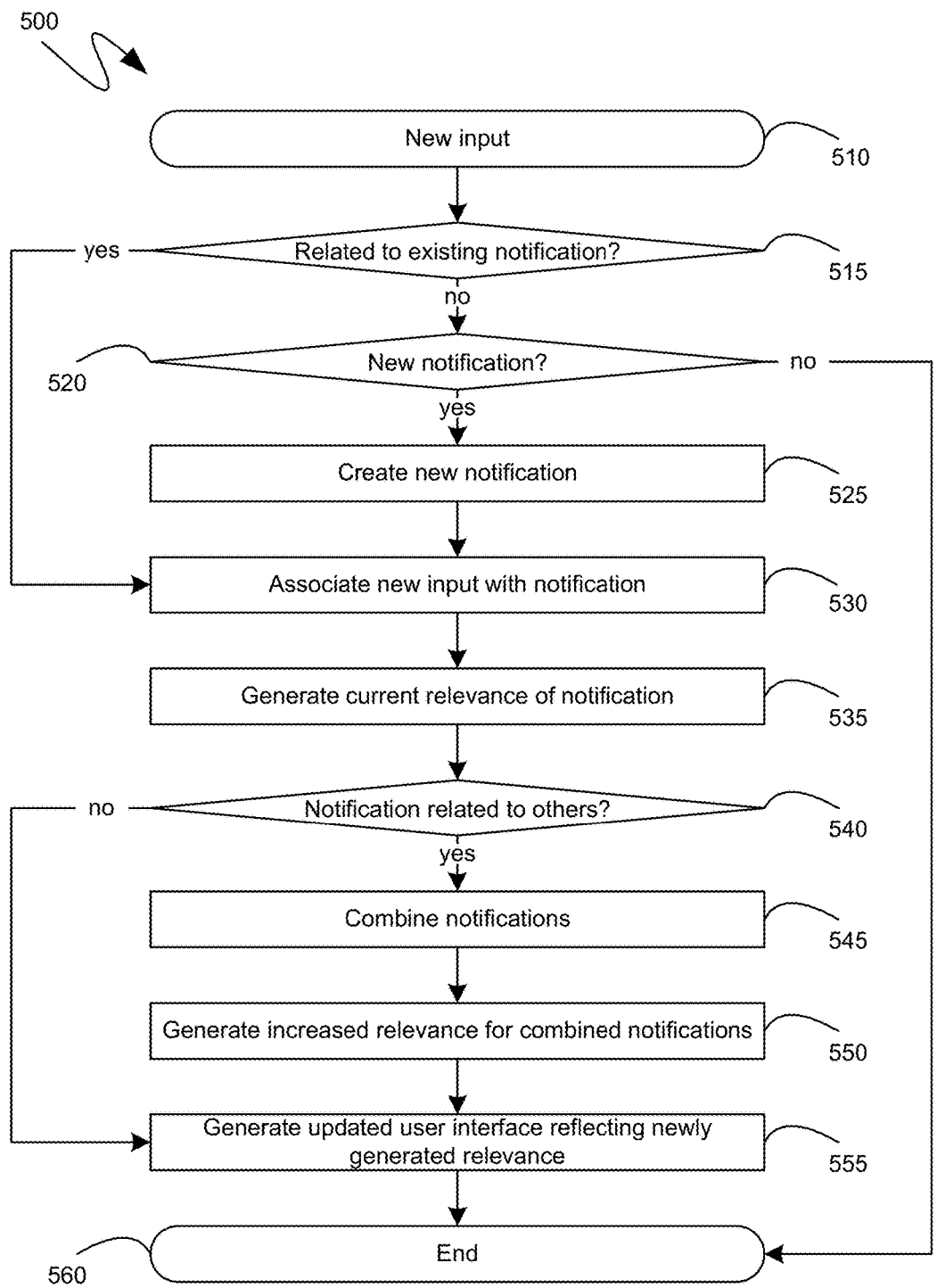
FIG. 5 is a flow diagram of an exemplary proactive presentation of information, via a computing device, to a user of that computing device.

Turning to FIG. 5, flow diagram 500 shown therein illustrates an exemplary series of steps by which relevance determinations can be made that can inform the proactive presentation of information to a user, such as via the tile-based user interfaces described in detail above. Initially, at step 510, new input can be received. Such new input can comprise any data that can, either by itself, or in combination with other data, trigger a notification to the user. For example, the new input 510 can include updated traffic information, user location data, occurrence time, receipt of an electronic mail message, receipt of a text message, receipt of calendaring information, or any other like input. Subsequently, at step 515, determination can be made as to whether the new input is related to an existing notification. For example, the new input 510 can be new traffic data, which can simply update existing traffic data. In such an instance, a notification regarding traffic data may already exist, although such a notification may not have associated with it a relevance sufficient to cause such a notification to resurface to the user. Consequently, at step 515, determination could be made that the new traffic data is related to existing traffic data notifications, and processing can proceed with step 530. Conversely, as another example, the new input 510 can be a meeting invite that the user has not previously received. In such an instance, determination can be made, at step 515, that the new input is not related to an existing notification, and processing can proceed to step 520, where a determination can be made as to whether a new notification should be generated for the new input received at step 510. More specifically, there may be instances in which no notification should be generated because the new input, received at step 510, is not the sort of information about which the user should be proactively notified. In such an instance, the processing of the new input can end at step 560. If, however, at step 520, it is determined that the new input, received at step 510, warrants the creation of a new notification, then such a new notification can be created at step 525. Processing can then proceed to associate the new input with a relevant notification, either the notification created at step 525, or some previously created notification that was identified at step 515.

The notification with which the new input is associated, at step 530, can be processed, subsequent to step 530, to generate a current relevance of such a notification at step 535. The determination, of the current relevance of a notification, at step 535, can be performed utilizing existing methodologies for assigning relevance including reference to pre-existing delineations and other predetermined factors. For example, traffic data that is unusually heavy or unusually light can carry a higher relevance than traffic data that is consistent with expected patterns. As another example, the receipt of an email message carrying a high importance indicator can be assigned a higher relevance then email message without such an indicator. Such existing methodologies, however, as described previously, are application centric in that they are evaluated based only upon information available to the application program through which the new input was received at step 510. Thus, for example, a mapping application program can determine whether traffic data deviates from expected patterns, but cannot determine whether such traffic data is relevant to the user given the users current location and the location of an upcoming event that the user desires to attend. As another example, a messaging application program can determine whether a received message is from an individual that the user often communicates with, and a relevance can be assigned based on such factor, but the messaging application program cannot determine that the individual from whom the message was received is also an individual listed on a meeting invite for an imminently occurring meeting.

Consequently, in one embodiment, processing can proceed to step 540, and a determination can be made as to whether the notification with which the new input, received at step 510, was associated is related to other notifications or other data known to the system. Returning to the above examples, if the new input, at step 510, was updated traffic data, then, by itself, such new input may not have much relevance and an associated notification, indicating the updated traffic data, would, also, not be assigned a high relevance by itself. However, at step 540, it can be determined that the updated traffic data, received at step 510, is relevant to an upcoming event that is located some distance away from the user's current location. Consequently, at step 540, notification regarding the user's upcoming event can be combined with the notification of the updated traffic data to generate a combined notification analogous to that illustrated in FIG. 1, whereby the user can be informed of an expected travel time between their current location and the location of a subsequent event which the user has scheduled. Such a combined notification can receive an increased relevance at step 550. As another example, if the new input, at step 510, was a message from an individual that the user does not typically correspond with, then such a message, by itself, may not have much relevance and an associated notification, indicating the receipt of such a message, would, also, not be assigned a high relevance by itself. However, at step 540, it can be determined that the message received, at step 510, is from an individual with whom the user has an eminently upcoming meeting. As will be recognized by those skilled in the art, in such an instance, the message may carry greater importance to the user since the message may be in regards to the eminently upcoming meeting including, for example, information that the user may desire to review prior to the meeting, or information indicating that the meeting has been changed or canceled. In response to such a determination, at step 540, the notification of the upcoming meeting can be combined with the notification of the receipt of the message at step 545 and an increased relevance can be assigned to such a combined notification at step 550.

Once the relevance of the notifications has been generated, an updated user interface that reflects such updated relevance information can be generated at step 555. The relevant processing of the new input, received at step 510, can then end at step 560. The generation of the updated user interface, at step 555, can, in one embodiment, invoke relevant graphics functionality, such as that provided by the graphics subsystem or graphics library of modern operating systems, to generate visual effects in accordance with the detailed descriptions above. As one example, which was described in detail above, the updated user interface, generated at step 555, can physically generate, on a physical display device communicationally coupled to a computing device, images that are evocative of tiles floating or sinking in a container of opaque liquid when viewed from the top of such a container. Thus, if the relevance assigned to the notification at step 535 and, if applicable, step 550, is an increased relevance, then, at step 555, the user interface can be generated such that a tile comprising such a notification is graphically represented in a manner evocative of such a tile floating to the surface of a container of opaque liquid, as viewed from the top. Similarly, if the relevance assigned to the notification at step 535 and, if applicable, step 550, is a decreased relevance, then, at step 555, the user interface can be generated such that a tile comprising such a notification is graphically represented in a manner evocative of such a tile sinking further down in a container of opaque liquid, as it would be seen from the top of such a container. Other visual paradigms, such as those described in detail above, can be equally implemented as part of the generation of the updated user interface performed at step 555.

Figure 6:
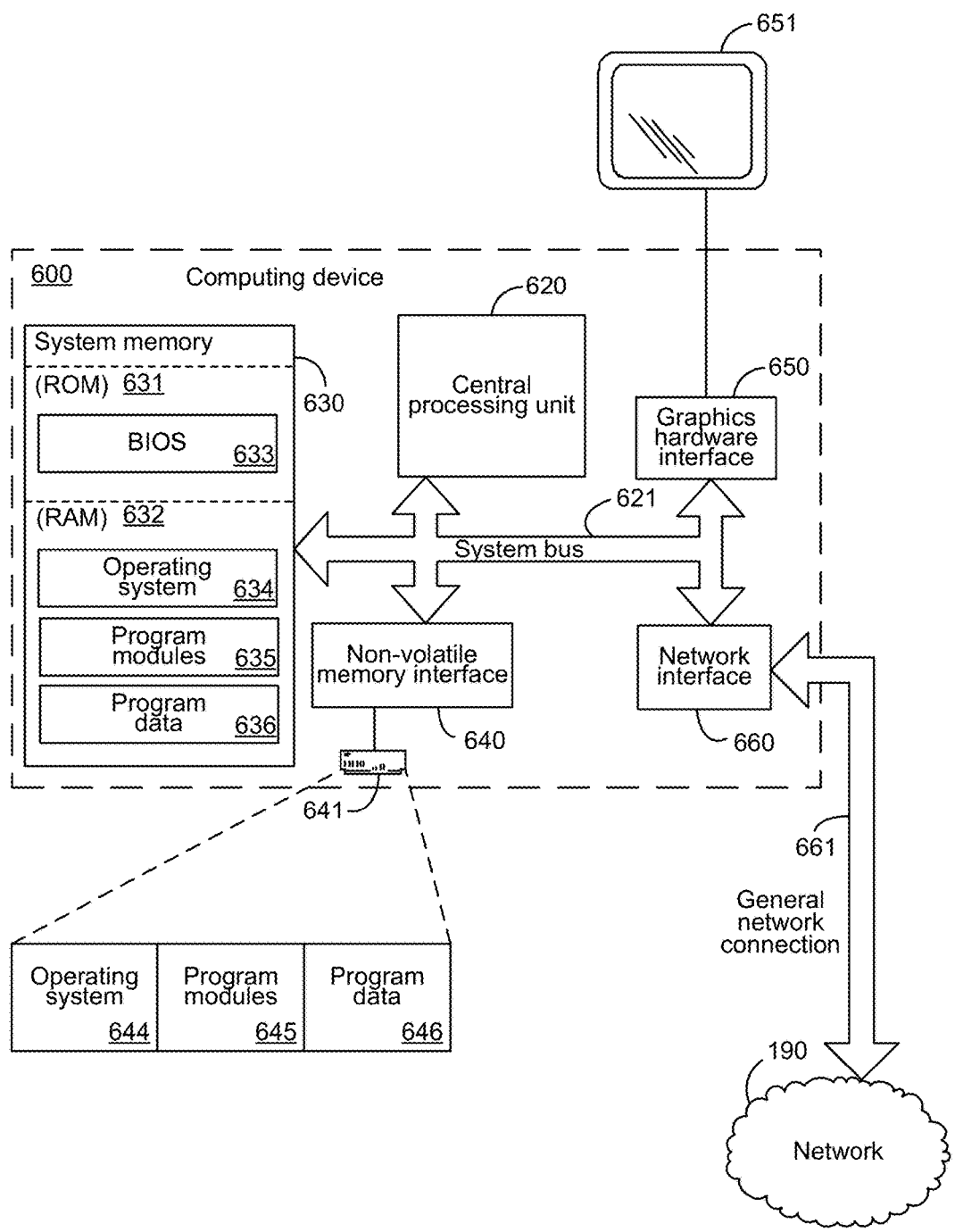
FIG. 6 is a block diagram of an exemplary computing device.

Turning to FIG. 6, an exemplary computing device 600 for implementing the above described mechanisms is illustrated. The exemplary computing device 600 can be any one or more of the computing devices referenced above, such as the exemplary tablet computing device 120 illustrated in FIG. 1, whose operation was described in detail above. The exemplary computing device 600 of FIG. 6 can include, but is not limited to, one or more central processing units (CPUs) 620, a system memory 630, that can include RAM 632, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, such as for the display of obscured content in the situations described in detail above. The graphics hardware can include, but is not limited to, a graphics hardware interface 650 and a display device 651, which can be a touchscreen display device that can simultaneously provide graphical output and accept user input. Depending on the specific physical implementation, one or more of the CPU 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and the aforementioned RAM 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates the operating system 634 along with other program modules 635, and program data 636, which can include the above referenced network browser.

The computing device 600 may also include other removable/non-removable, volatile/nonvolatile computer storage media. By way of example only, FIG. 6 illustrates the hard disk drive 641 that reads from or writes to non-removable, non-volatile media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 can operate in a networked environment using logical connections to one or more remote computers. The computing device 600 is illustrated as being connected to a general network connection 661 through a network interface or adapter 660 which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

As can be seen from the above description, mechanisms for generating a user interface that proactively provides information to a user have been presented. In view of the many possible variations of the subject matter described herein, we claim as our invention all such embodiments as may come within the scope of the following claims and equivalents thereto.

We claim:

1. A method for notifying a user via a graphical user interface that is physically generated on a hardware display device by a computing device, the method comprising the steps of:
   obtaining a first notification and a first relevance associated with the first notification;
   generating, as part of the graphical user interface, a first discrete visual element comprising the first notification, the first discrete visual element having a first size, a first shape, a first color intensity and a first transparency, wherein at least one of: the first size, the first shape, the first color intensity or the first transparency are selected based on the first relevance so as to cause the first discrete visual element to visually appear as if it is floating before the user in an opaque medium at a depth corresponding to the first relevance;
   subsequently obtaining a second relevance associated with the first notification, the second relevance representing a change from the first relevance; and
   regenerating, as part of the graphical user interface, the first discrete visual element by modifying at least one of: the first size, the first shape, the first color intensity or the first transparency in accordance with the second relevance so as to cause the first discrete visual element to visually appear as if it is moving out of the opaque medium towards the user if the second relevance is greater than the first relevance or to visually appear as if it is moving into the opaque medium away from the user if the second relevance is less than the first relevance.

2. The method of claim 1, wherein the opaque medium is an opaque gaseous material such that the generating the first discrete visual element comprises generating the first discrete visual element to visually appear as if it is floating in a container of the opaque gaseous material at the depth away from the user and being observed by the user looking into the container.

3. The method of claim 1, wherein the hardware display device is an LCD monitor, and wherein further the generating the first discrete visual element comprises generating the first discrete visual element, on the LCD monitor, as a two-dimensional projection that is visually evocative of an object in a three-dimensional space.

4. The method of claim 1, wherein the generating the first discrete visual element comprises generating the first discrete visual element as a three-dimensional visual element.

5. The method of claim 4, wherein the hardware display device allows at least some light through such that the generating the first discrete visual element as the three-dimensional visual element comprises generating the first discrete visual element as the three-dimensional visual element in an augmented reality comprising both the generated first discrete visual element as well as physical objects behind the hardware display device visible via the at least some light passing through the hardware display device.

6. The method of claim 1, wherein the generating the first discrete visual element to visually appear as if it is floating before the user in an opaque medium at a depth corresponding to the first relevance comprises graphically reducing a clarity of the first discrete visual element to simulate presence of an amount of the opaque medium between the first discrete visual element and the user, the amount being inversely proportional to the first relevance; and wherein further the regenerating the first discrete visual element comprises graphically increasing the clarity to simulate a decreasing amount of the opaque medium between the first discrete visual element and the user if the second relevance is greater than the first relevance and graphically decreasing the clarity to simulate an increasing amount of the opaque medium between the first discrete visual element and the user if the second relevance is less than the first relevance.

7. The method of claim 1, further comprising the steps of:
obtaining a second notification, differing from the first notification, and a third relevance associated with the second notification;
generating, as part of the graphical user interface, a second discrete visual element, differing from the first discrete visual element and comprising the second notification, the second discrete visual element having a second size, a second shape, a second color intensity and a second transparency, wherein at least one of: the second size, the second shape, the second color intensity or the second transparency are selected based on the third relevance so as to cause the second discrete visual element to visually appear as if it is floating before the user in the opaque medium, independently of the first discrete visual element, and at a depth corresponding to the third relevance.

8. The method of claim 1, further comprising the steps of:
generating, as part of the graphical user interface, a second discrete visual element, differing from the first discrete visual element and comprising a second notification;
wherein a visual proximity of the second discrete visual element to the first discrete visual element in the graphical user interface is indicative of a relationship between the second notification and the first notification.

9. The method of claim 8, wherein the visual proximity of the second discrete visual element to the first discrete visual element is such that, if the second notification is explicitly related to the first notification, the first and second discrete visual elements share an edge, and if the second notification is implicitly related to the first notification, the first and second discrete visual elements are generated with a visual gap between them.

10. The method of claim 1, wherein the first notification is based on a combination of information obtained from two or more separate and independent application programs.

11. The method of claim 1, wherein the second relevance is greater than a first relevance because a second notification was combined with the first notification into a single notification providing information that is based on information from both the first notification and the second notification.

12. A graphical user interface, physically generated on a hardware display device by a computing device, for notifying a user, the graphical user interface comprising:
a first discrete visual element comprising a first notification, the first discrete visual element having a graphically reduced clarity to simulate presence of an amount of opaque medium between the first discrete visual element and the user so as to visually appear as if the first discrete visual element is floating before the user in the opaque medium at a depth corresponding to a first relevance assigned to the first notification;
wherein the first discrete visual element moves within the user interface with at least one of: a translational motion or a rotational motion so as to further visually appear as if the first discrete visual element is floating before the user in the opaque medium; and
wherein further the first discrete visual element is graphically redrawn so as to:
graphically increase the clarity to simulate a decreasing amount of the opaque medium between the first discrete visual element and the user, thereby causing the first discrete visual element to visually appear as if it is moving out of the opaque medium towards the user if the first relevance increases; and
graphically decrease the clarity to simulate an increasing amount of the opaque medium between the first discrete visual element and the user, thereby causing the first discrete visual element to visually appear as if it is moving into the opaque medium away from the user if the first relevance decreases.

13. The graphical user interface of claim 12, wherein the opaque medium is an opaque gaseous material such that the first discrete visual element visually appears as if it is floating in a container of the opaque gaseous material at the depth away from the user and being observed by the user looking into the container.

14. The graphical user interface of claim 12, wherein the hardware display device is an LCD monitor, and wherein further the first discrete visual element is generated on the LCD monitor as a two-dimensional projection that is visually evocative of an object in a three-dimensional space.

15. The graphical user interface of claim 12, wherein the first discrete visual element is a three-dimensional visual element.

16. The graphical user interface of claim 15 providing an augmented reality that comprises both the first discrete visual element as the three-dimensional visual element as well as physical objects behind the hardware display device visible via at least some light passing through the hardware display device.

17. The graphical user interface of claim 12, further comprising a second discrete visual element, differing from the first discrete visual element and comprising a second notification differing from the first notification, the second discrete visual element being generated to visually appear as if the second discrete visual element is floating before the user in the opaque medium at a depth corresponding to a second relevance, associated with the second notification, and being observed by the user from above;

wherein the second discrete visual element moves within the user interface, independently of the movement of the first discrete visual element, with at least one of: the translational motion or the rotational motion so as to further visually appearing as if it is floating before the user in the opaque medium; and wherein further the second discrete visual element is graphically redrawn, independently of the first discrete visual element, so as to: visually appear as if it is moving out of the opaque medium towards the user if the second relevance increases and visually appear as if it is moving into the opaque medium away from the user if the second relevance decreases.

18. The graphical user interface of claim 17, wherein a visual proximity of the second discrete visual element to the first discrete visual element is indicative of a relationship between the second notification and the first notification.

19. A Liquid Crystal Display (LCD) device comprising liquid crystals, the liquid crystals being physically ordered to display a three-dimensional visual element comprising a first notification, the three-dimensional visual element having a graphically reduced clarity to simulate presence of an amount of opaque medium between the three-dimensional visual element and a user of the LCD device so as to visually appear as if the three-dimensional visual element is floating before the user in the opaque medium at a depth corresponding to a first relevance assigned to the first notification;

wherein the physical ordering of the liquid crystals is changed by the LCD device to visually move the three-dimensional visual element with at least one of: a translational motion or a rotational motion so as to further visually appear as if three-dimensional visual element is floating before the user in the opaque medium; and wherein further the physical ordering of the liquid crystals is further changed by the LCD device to:

graphically increase the clarity of the three-dimensional visual element to simulate a decreasing amount of the opaque medium between the three-dimensional visual element and the user, thereby causing the three-dimensional visual element to visually appear as if it is moving out of the opaque medium towards the user if the first relevance increases; and graphically decrease the clarity of the three-dimensional visual element to simulate an increasing amount of the opaque medium between the three-dimensional visual element and the user, thereby causing the three-dimensional visual element to visually appear as if it is moving into the opaque medium away from the user if the first relevance decreases.

20. The graphical user interface of claim 18, wherein the visual proximity of the second discrete visual element to the first discrete visual element is such that, if the second notification is explicitly related to the first notification, the first and second discrete visual elements share an edge, and if the second notification is implicitly related to the first notification, the first and second discrete visual elements are generated with a visual gap between them.

* * * * *